2,807,551

METHOD OF STERILIZING

Arno Brasch, Wolfgang Huber, and Adnan Waly, Brooklyn, N. Y., assignors to Electronized Chemicals Corporation, Brooklyn, N. Y., a corporation of Delaware No Drawing. Application January 5, 1953,
Serial No. 329,750

1 Claim. (Cl. 99—221)

The present invention relates to the elimination or marked suppression of organoleptic changes in substances, particularly foods, which have been sterilized by penetrating radiation of the ionization producing type.

Of the available ionizing radiations, high intensity electrons are particularly well suited for the sterilization of foods and similar substances, because of their predictable penetration range, ease of generation at high energy levels, high biological efficiency, penetrability of all types of packing materials, ready control and ease of protection of personnel.

Foodstuffs generally are heterogeneous mixtures of ampholytes, electrolytes, nonelectrolytes and inert substances, with the total solid content varying between 5% and 30%. For most such products, commercial sterility can be obtained with a dose of high intensity electrons equivalent to 1,500,000 REP. The term "REP" is an abbreviation of "Roentgen equivalent physical," a unit indicating the amount of energy absorbed in the form of ionizing radiation. The dose of $1.5 \times 10^6$ REP is equivalent to about $1.5 \times 10^8$ erg/g., 15 joule/g., 15 w. sec./g., and/or $1.5 \times 10^{-2}$ B. t. u./g. The fact that the absorption of such a dose produces sterility with a temperature rise of only 3.7° C. in water characterizes this technique as heatless preservation, and thus makes feasible the sterilization of substances in the raw or near raw state.

While the typical chemical and physical changes characteristic of heat processing are absent in irradiation preserved foodstuffs, other, sometimes undesirable, effects on taste, odor, color and texture nevertheless can occur. For convenience, such observable alteration of food or similar substances will be referred to as organoleptic change.

It is the principal object of the present invention to provide a novel process for the sterilization of certain foods or similar substances by ionizing penetrating radiation in which the organoleptic changes frequently accompanying such sterilization are suppressed.

An additional object is to provide a novel process of this character which is particularly adaptable to the packing of meats and meat products and which can be used alone or in conjunction with other processes intended for the same general purpose.

Other objects and advantages will become apparent from the following description of a preferred embodiment of this invention.

We have learned that most of the organoleptic changes referred to above which affect the taste, odor and appearance of a substance sterilized by electron bombardment are due to the formation of very small quantities of complex radiation activated oxygen and nitrogen compounds and combinations thereof in or upon the surface of the food substance. As an example, if cuts of meat or ground meat are bombarded with high velocity electrons of sufficient intensity to bring about sterility of the food product, it is usually found that the surface and to a lesser extent the interior of the meat or meat product becomes somewhat browned and that the taste and odor, primarily the latter, of the meat substance is somewhat affected in a rather characteristic fashion. It has been found that these changes occur whether or not the meat substance is in the open or is seared within an airtight package, such as a sheet metal packing can, for instance.

The present method, which is particularly adaptable for the packing of meat and meat products largely avoids these organoleptic changes and is carried out in the following fashion. The meat cut or meat product is sealed as quickly as is practicable within a can or other airtight container which is to serve the purpose of preventing recontamination of the food product after it has been sterilized by electron bombardment. In this packing process the container should be reasonably filled, that is, there should be as little air space left within the can as is practically possible so that the quantity of oxygen in association with the meat or meat product is kept to a minimum. After the meat product has been packed in this manner it is set aside under refrigeration—if desired it may be frozen—for a period that will vary between about a day on the one hand and as much as four days or so on the other hand, this storage time depending upon the type of meat, its freshness, the amount of the air or oxygen present within the can around or dissolved or occluded within the food substance, and the temperature at which it is stored.

After the packaged meat or meat product has been stored for an interval as indicated above, it then can be subjected to penetrating ionizing radiation in any suitable fashion at sufficient intensity to bring about sterility of the product without the development of objectionable organoleptic changes.

As specific examples of this method of processing the following are given. If ordinary beef sirloin steak is sealed reasonably soon within an airtight container and then bombarded with sterilizing doses of high velocity electrons to a dose of approximately $1.5 \times 10^6$ REP, the meat will be considerably browned and will have a characteristic objectionable odor and taste. If such meat identically packed is stored for twenty-four hours at from 3° to —15° C. and then irradiated, the odor and taste are greatly improved although the color still may be considered to be unsatisfactory in that it is browner than raw meat. If such containers of raw beef are stored for seventy-two hours at temperatures between 3° and —180° C. the results are still further improved, with the greatest improvement being noted in the range between —15° and —180° C. Within this range there is little detectable difference between the treated and untreated raw product. Similar storage for a period of ninety-six hours brings about slight additional improvement, but probably is hardly worthwhile, since the product as pointed out above will be in an excellent condition after storage for seventy-two hours.

Veal, lamb, pork and poultry similarly treated react substantially identically. That is, improvement is noted for a storage period up to about seventy-two hours after which the meat product after irradiation appears, tastes and smells much as the original raw meat and therefore is not susceptible of much additional improvement. Although it is possible by varying the storage conditions for different airtightly packed meats and meat products, depending upon the particular conditions encountered, to give some improvement over a standardized procedure, it will be seen from the above that a thoroughly satisfactory sterile product can be obtained by packing the meat or meat products in an airtight container and storing it for seventy-two hours at —15° C., after which it is bombarded with high velocity electrons to a dose of 1,500,000 REP.

We believe that the reason for this improvement in the quality of the packaged and sterilized product is probably due to the following phenomenon. The meat product at the time it is packed has to some extent at least retained the property of live tissue in the sense that individual cells or cell components within the meat or meat product are capable of metabolic, enzymatic processes. In other words, individual cells seem to have some of the properties of life. Because of this, after the meat or meat product has been sealed within the container and placed in storage for an interval an appreciable portion of these cells continue their metabolic process, thereby using up the oxygen in the container by utilizing this oxygen in this metabolic process so that it cannot be activated further by the radiation which follows. It appears, therefore, that at the time of irradiation the meat or meat product is for all practical purposes sealed within an airtight container in which there is no oxygen present either in the gaseous or dissolved state.

Although we have ascribed the effect described above largely to the continuing metabolic process, it is appreciated that the consumption of oxygen in the sealed container may in part be due to a non-enzymatic, chemical action and in fact it is possible that the non-enzymatic action may be largely responsible for the result. The important fact, however, is that not only is the oxygen in the can consumed by the meat or meat product during the interval of pre-storage, but that the compounds formed by such oxygen consumption are of a stable nature and do not break down with subsequent electron bombardment, or if they do in part break down, the resulting products are not objectionable and are not detected.

Although the process described has its principal application in the packing of meat and meat products and related substances such as fish, shelled eggs, dairy products and the like, we have found that the same effect occurs when some vegetables and fruits are blanched and then stored for a period between hermetic packing and sterilizing by radiation.

In carrying out the above process it is important that the food substance be packed under such conditions that the ability of the substance to consume oxygen is not exceeded by the quantity of oxygen present. Under some conditions, therefore, it is of advantage to vacuum-pack the product or to pack it in some inert gaseous or liquid medium, such that the quantity of oxygen present is only that dissolved or occluded in the food and absorbed to the surface of the food product and its container.

Having described our invention, what we claim as new and useful and desire to secure by Letters Patent of the United States is:

The method of preserving food substances which comprises hermetically sealing the food substance in a container, storing the container with the food substance sealed therein under refrigeration for a period of from seventy-two to ninety-six hours to permit the food substance to convert the contained atmospheric oxygen and oxygen absorbed within the food substance into stable compounds which do not produce objectionable radiation activated oxygen and nitrogen products when subjected to sterilizing doses of ionizing penetrating radiation, and finally subjecting the sealed and aged food substance to a sterilizing dose of ionizing penetrating radiation of the order of 1,500,000 REP through the wall of said container.

References Cited in the file of this patent

UNITED STATES PATENTS

| | | |
|---|---|---|
| Re. 23,195 | Brasch | Feb. 7, 1950 |
| 2,456,909 | Brasch | Dec. 21, 1948 |